(12) United States Patent
Sambhwani et al.

(10) Patent No.: US 11,838,970 B2
(45) Date of Patent: Dec. 5, 2023

(54) COMMUNICATIONS USING MULTIPLE RADIO ACCESS TECHNOLOGIES (RAT) FOR A MULTI-MODE USER EQUIPMENT (UE)

(71) Applicant: Apple Inc., Cupertino, CA (US)

(72) Inventors: Sharad Sambhwani, San Diego, CA (US); Dirk Nickisch, Munich (DE); Madhukar K. Shanbhag, Cupertino, CA (US); Sanjeevi Balasubramanian, Cupertino, CA (US); Shiva Krishna Narra, Cupertino, CA (US); Sriram Subramanian, Cupertino, CA (US); Vishwanth Kamala Govindaraju, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 17/363,707

(22) Filed: Jun. 30, 2021

(65) Prior Publication Data
US 2023/0007713 A1   Jan. 5, 2023

(51) Int. Cl.
*H04B 17/24* (2015.01)
*H04W 8/22* (2009.01)
(Continued)

(52) U.S. Cl.
CPC ............ *H04W 76/15* (2018.02); *H04B 17/24* (2015.01); *H04B 17/252* (2023.05); *H04W 8/22* (2013.01);
(Continued)

(58) Field of Classification Search
CPC .. H04B 7/02–12; H04B 17/0082–3913; H04L 5/0001–0098; H04W 8/22–245;
(Continued)

(56) References Cited

U.S. PATENT DOCUMENTS

2017/0222876 A1\* 8/2017 Van Der Velde ............................. H04W 36/0069
2021/0045177 A1\* 2/2021 Lee ................... H04W 36/0069
(Continued)

FOREIGN PATENT DOCUMENTS

WO   WO-2021/066701 A1   4/2021
WO   WO-2021/092102 A1   5/2021

OTHER PUBLICATIONS

Extended European Search Report, dated Nov. 23, 2022, for European Patent Appl. No. 22179119.7, 10 pages.

*Primary Examiner* — Timothy J Weidner
(74) *Attorney, Agent, or Firm* — Sterne, Kessler, Goldstein & Fox P.L.L.C.

(57) ABSTRACT

Some aspects of this disclosure relate to apparatuses and methods for communicating in a first radio access technology (RAT) and a second RAT. A user equipment (UE) can receive, from a first base station using the first RAT, first configuration information for the UE to communicate with a second base station via the second RAT; and receive, from the first base station using the first RAT, a downlink message to enable a communication link between the UE and the second base station via the second RAT. The downlink message includes second configuration information for the UE to communicate with the second base station via the second RAT. The UE can establish the communication link between the UE and the second base station using the second RAT based on a link configuration obtained from the first configuration information and the second configuration information.

20 Claims, 11 Drawing Sheets

(51) Int. Cl.
| | |
|---|---|
| *H04W 24/08* | (2009.01) |
| *H04W 24/10* | (2009.01) |
| *H04W 36/00* | (2009.01) |
| *H04W 76/15* | (2018.01) |
| *H04W 76/19* | (2018.01) |
| *H04W 76/34* | (2018.01) |
| *H04W 76/38* | (2018.01) |
| *H04W 84/02* | (2009.01) |
| *H04W 88/06* | (2009.01) |
| *H04W 88/08* | (2009.01) |
| *H04W 92/02* | (2009.01) |
| *H04W 92/10* | (2009.01) |
| *H04W 28/086* | (2023.01) |
| *H04B 17/20* | (2015.01) |

(52) U.S. Cl.
CPC ........... *H04W 24/08* (2013.01); *H04W 24/10* (2013.01); *H04W 28/0865* (2023.05); *H04W 36/0033* (2013.01); *H04W 36/0058* (2018.08); *H04W 36/00698* (2023.05); *H04W 76/19* (2018.02); *H04W 76/34* (2018.02); *H04W 76/38* (2018.02); *H04W 84/02* (2013.01); *H04W 88/06* (2013.01); *H04W 88/08* (2013.01); *H04W 92/02* (2013.01); *H04W 92/10* (2013.01)

(58) Field of Classification Search
CPC ..... H04W 24/02–10; H04W 28/02–26; H04W 36/0005–385; H04W 48/02–20; H04W 72/005–14; H04W 74/002–02; H04W 76/10–50; H04W 84/005–22; H04W 88/005–188; H04W 92/02–24
See application file for complete search history.

(56) References Cited

U.S. PATENT DOCUMENTS

| | | | |
|---|---|---|---|
| 2021/0051749 A1* | 2/2021 | Adusumilli | H04W 36/0069 |
| 2021/0250825 A1* | 8/2021 | Purkayastha | H04W 36/0069 |
| 2022/0386191 A1* | 12/2022 | Wu | H04W 36/0069 |

* cited by examiner

COMMUNICATIONS USING MULTIPLE RADIO ACCESS TECHNOLOGIES (RAT) FOR A MULTI-MODE USER EQUIPMENT (UE)

BACKGROUND

Field

The described aspects generally relate to communication using multiple radio access technologies (RAT) for a multi-mode user equipment (UE) supporting multiple RATs.

Related Art

A radio access technology (RAT) is the underlying physical connection method for a radio based wireless communication network. A multi-mode user equipment (UE) can support several RATs in one device such as Bluetooth, Wi-Fi, global system for mobiles (GSM), universal mobile telecommunications system (UMTS), or long-term evolution (LTE). In addition, the 3rd Generation Partnership Project (3GPP) has developed a new RAT known as fifth generation (5G) New Radio (NR) RAT. A multi-mode UE supporting several RATs can provide flexibility and conveniences to the users. However, it is desired to improve the operational efficiency for a multi-mode UE.

SUMMARY

Some aspects of this disclosure relate to apparatuses and methods for implementing mechanisms to support communication using multiple radio access technology (RAT) for a multi-mode user equipment (UE). A multi-mode UE can wirelessly communicate using at least a first RAT and a second RAT, such as a RAT different from a fifth generation (5G) New Radio (NR) RAT and the NR RAT. The NR RAT can provide more services to the user, but NR networks may not be available all of the time and in all situations. In some systems, 5G NR are deployed using non-standalone (NSA) option. In a NSA setup, the NR radio links are anchored onto at least one long-term evolution (LTE) carrier with signaling radio bearer (SRB) being setup on LTE. The SRB is used to transfer the control information to configure the NR RAT for NSA operations performed by the UE. Efficient setup of the NR RAT is desired.

Some aspects of this disclosure relate to a UE. The UE can include a transceiver, a memory, and a processor communicatively coupled to the transceiver and the memory. The transceiver can be configured to enable wireless communication with a first base station as a primary node using a first RAT and with a second base station as a secondary node using a second RAT. The first RAT can include universal mobile telecommunications system (UMTS) terrestrial radio access network (UTRAN), global system for mobiles (GSM) edge radio access network (GERAN), or long-term evolution (LTE) evolved utran (E-UTRAN), while the second RAT can include NR next generation radio access network (NG-RAN). The first base station can include an evolved NodeB (eNB), and the second base station can include a next generation NodeB (gNB). There can be other kinds of first RAT and second RAT for some other embodiments. In some examples, the UE can have NR Dual Connectivity using a NR link in Master Cell Group (MCG) and a second NR link in Secondary Cell Group (SCG). Furthermore, the NR MCG can operate in frequency range 1 (FR1) (sub 6 GHz) and NR SCG can operate in mmWave (>24 GHz). The descriptions provided herein can be equally applicable to the UE having NR dual connectivity, or any other first RAT and second RAT.

According to some aspects, the memory can be configured to store first configuration information for the UE to communicate with the second base station using the second RAT. In some embodiments, the first configuration information can include data radio bearer configuration information, physical layer (PHY) configuration information, measurement configuration information, a physical cell identifier (PCI), or a UE identifier. In some embodiments, the first configuration information can include default configuration information received in a radio resource control (RRC) message from the first base station using the first RAT. The default configuration information can include shared parameters for the UE to communicate across multiple base stations including the second base station using the second RAT. In some embodiments, the UE can further include a timer, where the first configuration information stored in the memory becomes invalid based on expiration of the timer.

According to some aspects, the processor of the UE can be configured to receive, from the first base station using the first RAT, a downlink message to enable a communication link between the UE and the second base station via the second RAT. The downlink message can include second configuration information for the UE to communicate with the second base station via the second RAT. The downlink message can be received when the UE enters a cell managed by the second base station, the UE is handed over from an other cell to the cell managed by the second base station, or the UE re-enters the cell managed by the second base station after leaving the cell. In some embodiments, the downlink message can include a RRC message for the first RAT, a medium access control (MAC)-control element (MAC-CE) for the first RAT, or a downlink control information (DCI) for the first RAT.

According to some aspects, the processor can be further configured to establish the communication link between the UE and the second base station using the second RAT based on a link configuration obtained from the first configuration information and the second configuration information. In some embodiments, the link configuration can be based entirely on the first configuration information. The first configuration information can include a link configuration for a previous communication link between the UE and the second base station using the second RAT that is stored in the memory when the previous communication link is released. In detail, the processor can be further configured to receive a downlink release message using the first RAT from the first base station to release the previous communication link using the second RAT; store in the memory the link configuration for the previous communication link between the UE and the second base station using the second RAT; and release the previous communication link between the UE and the second base station.

According to some aspects, the processor can be further configured to perform a measurement to detect whether a service in the second RAT is available to the UE; generate, based on the performed measurement, a measurement report including an indication that the first configuration information is stored in the UE; and send the measurement report to the first base station. The communication link between the UE and the second base station in the second RAT can be established based on the measurement report.

Some aspects of this disclosure relate to a method performed by a UE. The method includes receiving, from a first base station using a first radio access technology (RAT), first configuration information for the UE to communicate with a second base station via a second RAT; and receiving, from the first base station using the first RAT, a downlink message to enable a communication link between the UE and the second base station via the second RAT. The downlink message includes second configuration information for the UE to communicate with the second base station via the second RAT. The method further includes establishing the communication link between the UE and the second base station using the second RAT based on a link configuration obtained from the first configuration information and the second configuration information.

Some aspects of this disclosure relate to non-transitory computer-readable medium storing instructions. When executed by a processor of a UE, the instructions stored in the non-transitory computer-readable medium cause the UE to perform various operations. The operations include receiving, from a first base station using a first RAT, first configuration information for the UE to communicate with a second base station via a second RAT; and receiving, from the first base station using the first RAT, a downlink message to enable a communication link between the UE and the second base station via the second RAT. The downlink message includes second configuration information for the UE to communicate with the second base station via the second RAT. The operations further include establishing the communication link between the UE and the second base station using the second RAT based on a link configuration obtained from the first configuration information and the second configuration information.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
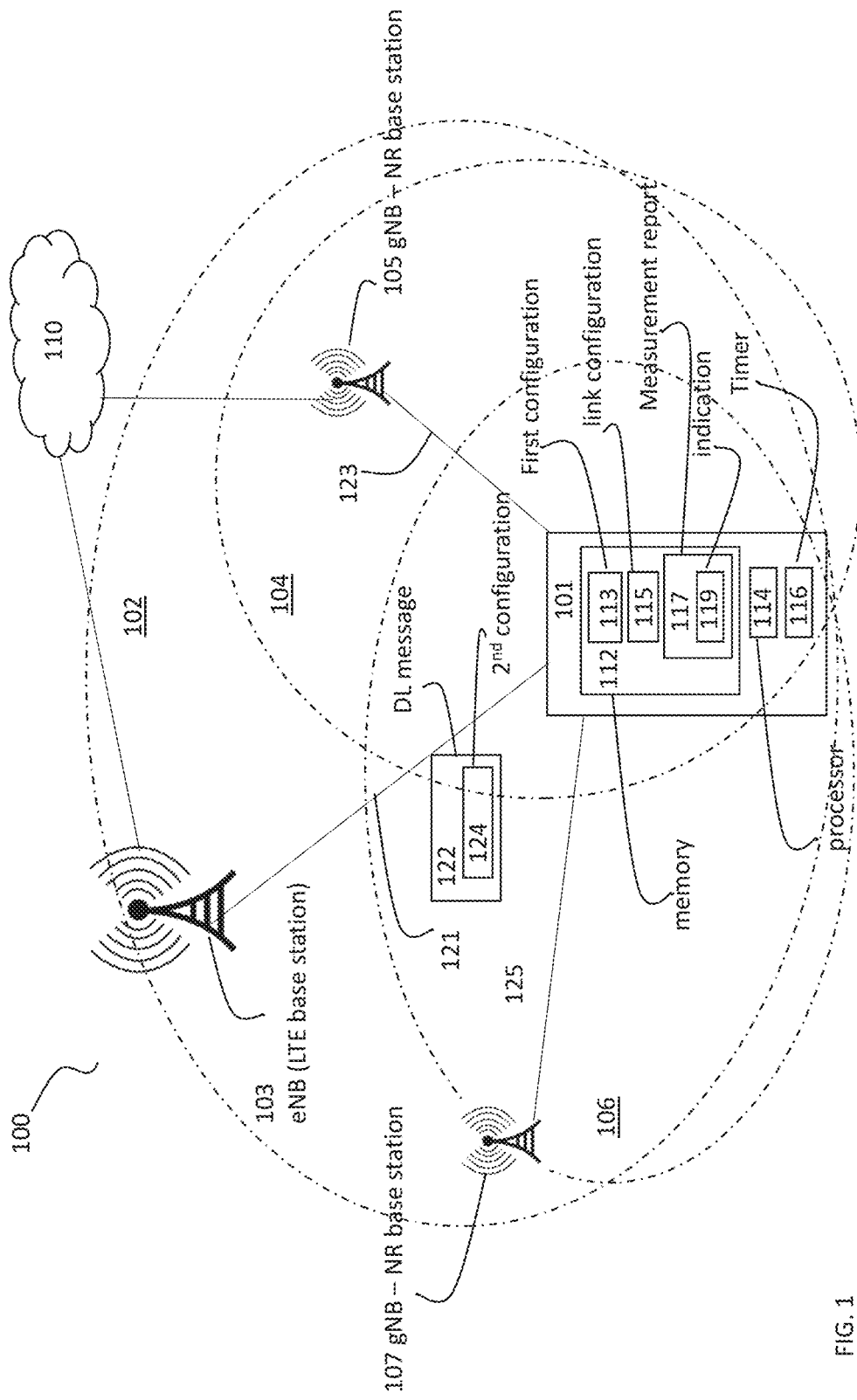
FIG. 1 illustrates a wireless system including a user equipment (UE) configured to communicate with a first base station using a first radio access technology (RAT) and with a second base station using a second RAT, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

A multi-mode user equipment (UE) can wirelessly communicate using at least a first radio access technology (RAT) and a second RAT, such as a RAT different from a fifth generation (5G) New Radio (NR) RAT and the NR RAT. In some systems, the 5G NR RAT are deployed using non-standalone (NSA) option where the NR radio links are anchored onto at least one long-term evolution (LTE) carrier. Such a network or system can be referred to as having LTE evolved NodeB (eNB)-5G next generation NodeB (gNB) dual connectivity (EN-DC), where the UE operates in the EN-DC mode. In addition, the UE can operate in LTE standalone (SA) mode without using the NR RAT. In the EN-DC mode, signaling radio bearer (SRB) can be setup on LTE to transfer control information to configure the UE for the NR RAT operations. Efficient setup of the NR RAT is desired. LTE-NR interworking (EN-DC) in NSA is only one possibility for a multi-mode UE. Techniques disclosed herein can be applicable to other RATs as well.

The setup, activation, or addition of NR branch or service can usually be based on the UE's event measurement report message to a base station, e.g., B1 event measurement report message. B1 event measurement report message can be used by the UE to report the presence of NR coverage, and NR neighbor cell measurements. The network can use B1 event measurement report message as a trigger to setup the NR branch or service. In detail, the base station can send a LTE radio resource control (RRC) connection reconfiguration message to the UE to provide the full configuration of the NR cell and the data radio bearer so that user data can be transferred over the NR link. As a result, in a NSA system, the activation and deactivation of the NR service or branch can be controlled by the network and signaled to UE using LTE RRC connection reconfiguration messages over the LTE RAT. Such LTE RRC connection reconfiguration messages are usually long RRC over the air (OTA) messages causing a lot of data traffic.

In addition, when the UE goes out of a NR coverage area and needs to switch to LTE only connection, control signaling between the UE and the network is required. The UE can report the NR radio link failure status to the base station, and the base station or the network can reconfigure the UE for LTE only connection. The NR link can be released and data radio bearer can be reconfigured for LTE only operations. According to the solution defined by 3GPP standard, when the NR link is released, the UE deletes the complete NR configuration.

In some examples, the NR branch addition or removal can become frequent in daily usage. For example, when a user wonders around a building, or walks between spots with good and bad coverage, the NR branch addition or removal can happen frequently. Similarly, when a UE moves in slow traffic with blocking line-of-sight (LOS), or the UE experiences bursty data, the NR branch addition or removal can happen frequently as well. Frequent NR secondary cell group (SCG) setup and release procedures can cause high signaling load in LTE networks jamming LTE devices. Signaling between the UE and the network and between network notes can also cause delays for setting up the NR branch. In such cases, the signaling traffic from 5G users can cause a heavy load on the control channels and may jam the anchor LTE network. In addition to the signaling between UE and network, each setup or release of the NR RAT can also require signaling and handshaking between master LTE network node (MN) and slave NR network node (SN).

In some embodiments, to avoid congestion in the anchor LTE network with RRC reconfiguration messages from 5G NSA users, RRC reconfiguration messages to activate or deactivate the NR branch are redesigned so that the message size is reduced if cannot be removed completely. NR configuration content received from the base station may be the same or almost the same in a certain situations. When the UE stays in the same LTE anchor cell and NR cell, the configuration for the NR cell can be identical for each setup or release of the NR branch, e.g., SCG addition and SCG release. Hence, it may not be needed to send a large amount of signaling data to carry the same content for the NR configuration.

In embodiments, the UE can store first configuration information for the UE to communicate with the second base station using the second RAT. The first configuration information can be default configuration information including shared parameters for the UE to communicate across multiple base stations using the second RAT. The default configuration information can be received in a RRC message from the first base station using the first RAT. Additionally and alternatively, the first configuration information can include a link configuration for a previous communication link between the UE and the base station using the second RAT. The UE can also receive some additional configuration information from the first base station using the first RAT. The UE can then determine a link configuration obtained from the first configuration information and the additional configuration information. The UE can establish the communication link between the UE and the second base station using the second RAT based on the link configuration. The additional configuration information from the first base station can be of smaller size since the additional configuration information only needs to carry the difference between the intended configuration and the default configuration or between the intended configuration and the link configuration for a previous communication link.

In embodiments, a UE can autonomously maintain the used NR configuration context when releasing the NR link and reuse it whenever adding the NR link again. In addition, a UE can receive default NR configuration that can be reused at each and every NR link addition. Network may only signal configuration parts that have changed, such as a different Physical Cell ID (PCI) in case a different NR cell is accessed. Furthermore, the base station or the network can use medium access control (MAC) Control Element signaling or downlink control information (DCI) signaling to quickly enable or disable the 5G link (based on preserved NR context of NR default configuration) to avoid costly RRC signaling. Moreover, the UE can use enhancement of LTE measurement report message to signal that UE has some NR configuration context preserved or an NR default configuration stored that can be reused.

FIG. 1 illustrates a wireless system 100 including a UE, e.g., UE 101, configured to communicate with a first base station using a first RAT and with a second base station using a second RAT, according to some aspects of the disclosure. Wireless system 100 is provided for the purpose of illustration only and does not limit the disclosed aspects. Wireless system 100 can include, but is not limited to, UE 101, a base station 103, a base station 105, and a base station 107, all communicatively coupled to a core network 110. UE 101 communicates with base station 103 over a communication link 121, communicates with base station 105 over a communication link 123, and communicates with base station 107 over a communication link 125.

In some examples, wireless system 100 can be a NSA system that includes one or more of a NR system, a LTE system, a 5G system, or some other wireless system. There can be other network entities, e.g., network controller, a relay station, not shown. Wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103, base station 105, and base station 107 can be a fixed station or a mobile station. Base station 103, base station 105, and base station 107 can also be called other names, such as a base transceiver system (BTS), an access point (AP), a transmission/reception point (TRP), an evolved NodeB (eNB), a next generation node B (gNB), a 5G node B (NB), or some other equivalent terminology. In some examples, base station 103 can be an eNB, while base station 105 and base station 107 can be a gNB. In some examples, base station 103, base station 105, and base station 107 can be interconnected to one another and/or to other base station or network nodes in a network through various types of backhaul interfaces such as a direct physical connection, a virtual network, and/or the like, not shown.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, UE 101 can wireless communicate with a first base station, e.g., base station 103, as a primary node using a first RAT and communicate with a second base station, e.g., base station 105, as a secondary node using a second RAT. The first RAT can include universal mobile telecommunications system (UMTS) terrestrial radio access network (UTRAN), global system for mobiles (GSM) edge radio access network (GERAN), or long-term evolution (LTE) evolved UTRAN (E-UTRAN), while the second RAT can include NR next generation radio access network (NG-RAN). The first base station can include an eNB, and the second base station can include a gNB.

According to some aspects, base station 103, base station 105, and base station 107 can be communicatively coupled to core network 110. Base station 103 can serve a cell 102, base station 105 can serve a cell 104 contained within cell 102, and base station 107 can serve a cell 106 contained within cell 102 that overlaps with cell 104. In some other embodiments, cell 102 can overlap partially with cell 104 or cell 106. Cell 102, cell 104, and cell 106 can be a macro cell, a pico cell, a femto cell, and/or another type of cell. In comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, cell 102 can be a macro cell, while cell 104 and cell 106 can be a pico cell or a femto cell. In addition, cell 102 can be a pico cell while cell 104 and cell 106 can be a femto cell. In some examples, the geographic area of a cell can move according to the location of a mobile base station.

According to some aspects, base station 103 can be the serving base station or a primary node, and cell 102 can be the serving cell or primary cell. Base station 105 and base station 107 can be neighbor base station to UE 101 that can be a secondary node. Cell 104 and cell 106 can be a secondary cell, or a primary secondary cell. There can be other secondary cells for UE 101, not shown. Data for UE 101 can be simultaneously transferred between UE 101 and core network 110 by a radio connection between UE 101 and base station 103 at communication link 121, a radio connection between UE 101 and base station 105 at communication link 123, and a radio connection between UE 101 and base station 107 at communication link 125. UE 101 can communicate with the serving base station, e.g., base station 103, using a first frequency band, and communicate with a neighbor base station, e.g., base station 105 or base station 107 using a second frequency band different from the first frequency band.

According to some aspects, base station 103 can be a LTE base station or an eNB, and UE 101 can wirelessly communicate using a first RAT with base station 103, which can be an E-UTRAN. Base station 103 and core network 110 can form a LTE wireless communication system. In addition, base station 105 can be a NR base station, e.g., a gNB, and UE 101 can wirelessly communicate using a second RAT, e.g., the NR RAT, with base station 105 in a NG-RAN. Base station 105 and core network 110 can form a NR wireless communication system. Similarly, base station 107 can be a NR base station, and UE 101 can wirelessly communicate using a second RAT with base station 107 in a NG-RAN.

Figure 2:
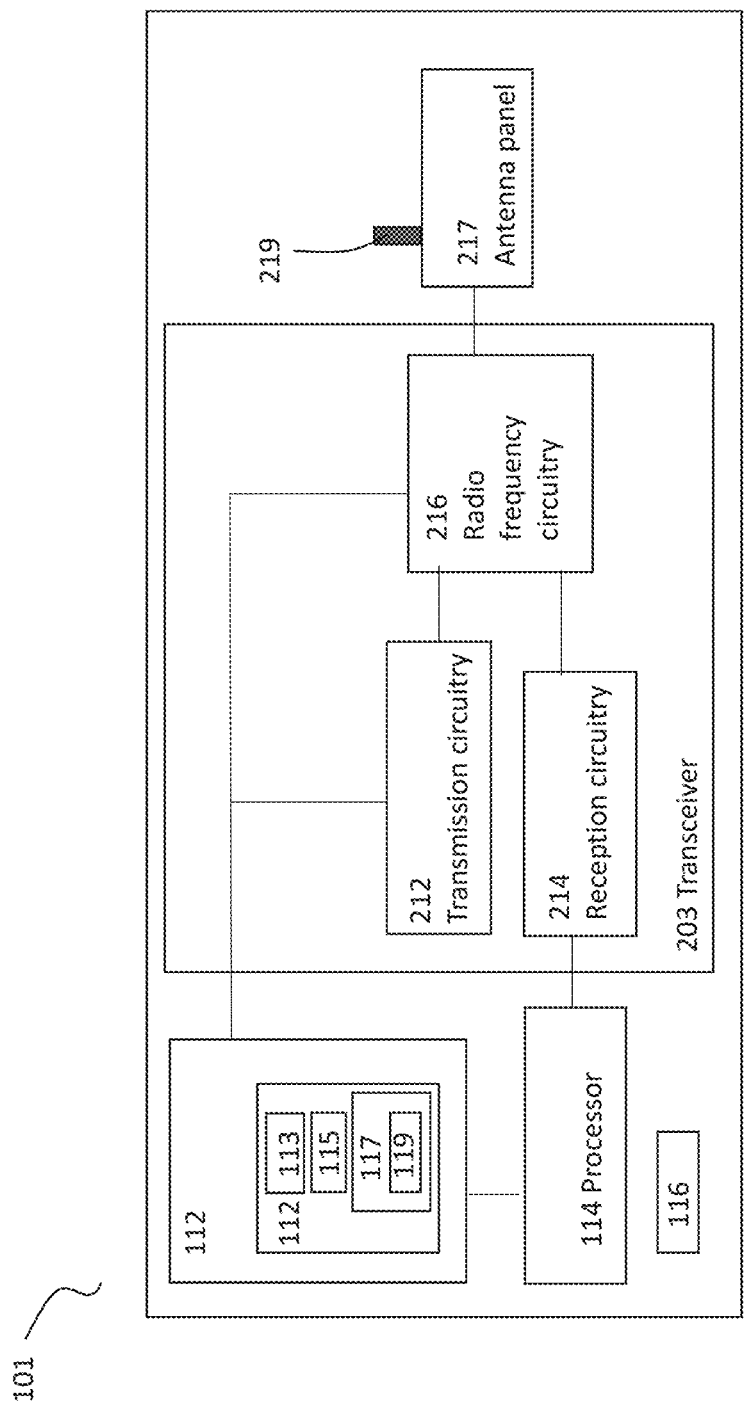
FIG. 2 illustrates a block diagram of a UE to perform functions described herein, according to some aspects of the disclosure.

According to some aspects, UE 101 can include a memory 112, and a processor 114 communicatively coupled to the memory, a timer 116, and a transceiver, as shown in FIG. 2. Memory 112 can be configured to store first configuration information 113 for UE 101 to communicate with the second base station, e.g., base station 105, using the second RAT. In some embodiments, the first configuration information 113 can include data radio bearer configuration information, physical layer (PHY) configuration information, measurement configuration information, a physical cell identifier (PCI), or a UE identifier. In some embodiments, the first configuration information 113 can include default configuration information received in a RRC message from base station 103 using the first RAT, e.g., the LTE RAT. The default configuration information can include shared parameters for the UE to communicate across multiple base stations including the second base station using the second RAT, such as base station 105 and base station 107. In some embodiments, the first configuration information 113 stored in memory 112 becomes invalid based on expiration of timer 116. In some embodiments, UE 101 can maintain two configurations in parallel: a configuration for pure LTE standalone (SA) operations, and one configuration for EN-DC that includes NR and LTE interworking.

According to some aspects, processor 114 can be configured to receive, from the first base station, e.g., base station 103, using the first RAT such as the LTE RAT, a downlink message 122 to enable a communication link, e.g., communication link 123, between UE 101 and the second base station, e.g., base station 105, via the second RAT. Downlink message 122 can include second configuration information 124 for UE 101 to communicate with the second base station via the second RAT. The downlink message 122 can be received when UE 101 enters a cell managed by the second base station, UE 101 is handed over from an other cell to the cell managed by the second base station, or UE 101 re-enters the cell managed by the second base station after leaving the cell. In some embodiments, downlink message 122 can include a RRC message for the first RAT, a medium access control (MAC)-control element (MAC-CE) for the first RAT, or a downlink control information (DCI) for the first RAT.

Table 1 below provides an overview on observed LTE RRC message sizes for adding NR SCG services, which are examples of downlink message 122. The LTE RRC message can contain some reconfiguration of LTE and it contains the full NR configuration. The message size in T-Mobile® network is smaller compared to Verizon® and AT&T® as T-Mobile only deployed 2 NR component carriers while Verizon® and AT&T® have deployed 4 NR carriers.

TABLE 1

Message Size for NR SCG Addition

| Operator -Location-<br>Network Vendor | LTE message<br>size incl. NR<br>configuration (bytes) | Size of NR configuration<br>contained in LTE<br>message (bytes) |
| --- | --- | --- |
| Verizon-Chicago | 3469 | 3274 |
| AT&T-Cupertino | 3554 | 3383 |
| T-Mobile-Cupertino | 2203 | 1943 |

For various cells managed by base station 103 and for different times, downlink message 122, which can be LTE reconfiguration messages, may have almost the same content with only few minor parts differences. For example, parameters for NR configuration between 2 NR RRC reconfigurations on the same NR PCI may only include a different identifier, such as a newUE-Identity, while the rest of NR configuration parameters are the same. For 2 different LTE RRC Reconfigurations, there may only be a few parameters that are different, such as a reportConfigId, Meas ID, sr-ConfigIndex, and cqi-pmi-ConfigIndex, while the rest of the LTE RRC Reconfigurations are the same.

According to some aspects, processor 114 can be further configured to establish communication link 123 between UE 101 and base station 105 using the second RAT such as the NR RAT, based on a link configuration 115 obtained from the first configuration information 113 and the second configuration information 124. In some embodiments, link configuration 115 can include at least a portion of the first configuration information 113 stored on UE 101, and at least a portion of the second configuration information 124 received from base station 103. In some embodiments, link configuration 115 can be based entirely on the first configuration information 113.

In some embodiments, the first configuration information 113 can include a link configuration for a previous communication link between UE 101 and base station 103 using the second RAT that is stored in memory 112 when the previous communication link is released. In detail, processor 114 can receive a downlink release message using the first RAT from base station 103 to release the previous communication link using the second RAT; store in memory 112 the link configuration for the previous communication link between UE 101 and base station 105 using the second RAT; and release the previous communication link between UE 101 and base station 105. The stored link configuration for the previous communication link becomes the configuration information 113.

According to some aspects, processor 114 can be further configured to perform a measurement to detect whether a service in the second RAT is available to UE 101. In addition, processor 114 can generate, based on the performed measurement, a measurement report 117 including an indication 119 that the first configuration information 113 is stored in UE 101; and send measurement report 117 to base station 103. Communication link 123 between UE 101 and base station 105 in the second RAT can be established based on measurement report 117. For example, base station 103 can transfer the second configuration information 124 as the difference between the first configuration information 113 and the desired configuration information, instead of a full configuration information that can be very long as provided in examples shown in Table 1.

FIG. 2 illustrates a block diagram of UE 101, having antenna panel 217 including one or more antenna elements, e.g., an antenna element 219 coupled to transceiver 203 and controlled by processor 114. In detail, transceiver 203 can include radio frequency (RF) circuitry 216, baseband transmission circuitry 212, and baseband reception circuitry 214. RF circuitry 216 can include multiple parallel RF chains for one or more of transmit or receive functions, each connected to one or more antenna elements of the antenna panel. In addition, processor 114 can be communicatively coupled to memory 112, which is further coupled to transceiver 203, and timer 116.

In some examples, RF circuitry 216 is used by UE 101 to perform measurements of reference signals, and to transmit and receive data in the serving cell. Memory 112 can store the first configuration information 113, link configuration 115, and measurement report 117 including indication 119. Memory 112 can include instructions, that when executed by processor 114 perform the functions to establish communication link 123 between UE 101 and base station 105 using the second RAT based on link configuration 115 obtained from the first configuration information 113 and the second configuration information 124 described above. Alternatively, processor 114 can be "hard-coded" to perform the functions described herein.

Figure 3:
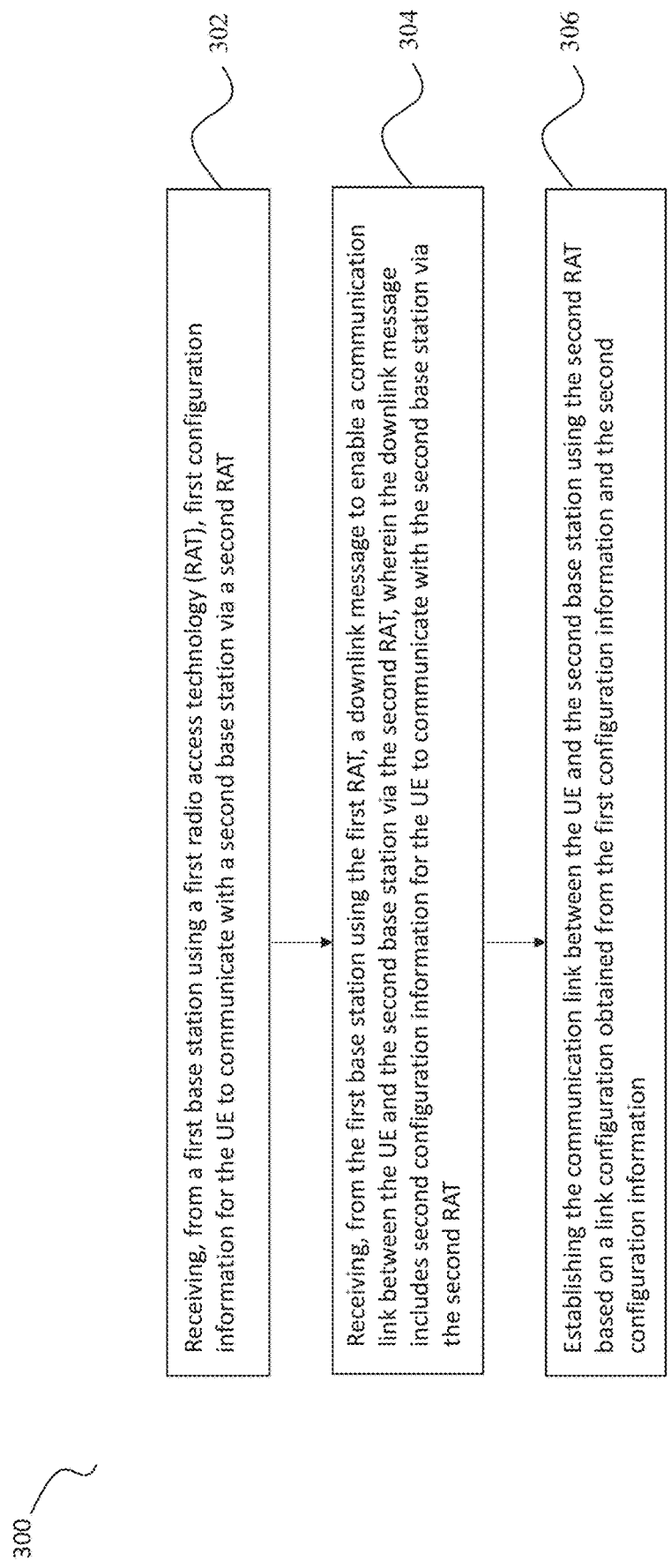
FIG. 3 illustrates an example method performed by a UE to communicate with a first base station using a first RAT and with a second base station using a second RAT, according to some aspects of the disclosure.

FIG. 3 illustrates an example method 300 performed by a UE to communicate with a first base station using a first RAT and with a second base station using a second RAT, according to some aspects of the disclosure. Method 300 can be performed by UE 101 as shown in FIGS. 1-2. FIGS. 4-8 illustrate example sequence diagrams illustrating operations performed by a UE to communicate in a first RAT and a second RAT, according to some aspects of the disclosure. Sequence diagrams shown in FIGS. 4-8 can provide more details of operations performed by method 300.

At 302, UE 101 can receive, from a first base station using a first RAT, first configuration information for the UE to communicate with a second base station via a second RAT. For example, UE 101 can receive from base station 103 using the LTE RAT, first configuration information 113 for UE 101 to communicate with base station 105 via the NR RAT.

At 304, UE 101 can receive, from the first base station using the first RAT, a downlink message to enable a communication link between the UE and the second base station via the second RAT. The downlink message includes second configuration information for the UE to communicate with the second base station via the second RAT. For example, UE 101 can receive from base station 103 using the LTE RAT, downlink message 122 to enable communication link 123 between UE 101 and base station 105 via the NR RAT. Downlink message 122 includes the second configuration information 124 for UE 101 to communicate with base station 105 via the NR RAT. The second configuration information 124 includes information to update one or more parameters of the first configuration information 113.

At 306, UE 101 can establish the communication link between the UE and the second base station using the second RAT based on a link configuration determined from the first configuration information and the second configuration information. For example, UE 101 can establishing communication link 123 between UE 101 and base station 105 using the NR RAT based on link configuration 115 obtained from the second configuration information 124 and the first configuration information 113 stored by UE 101.

Figure 4:
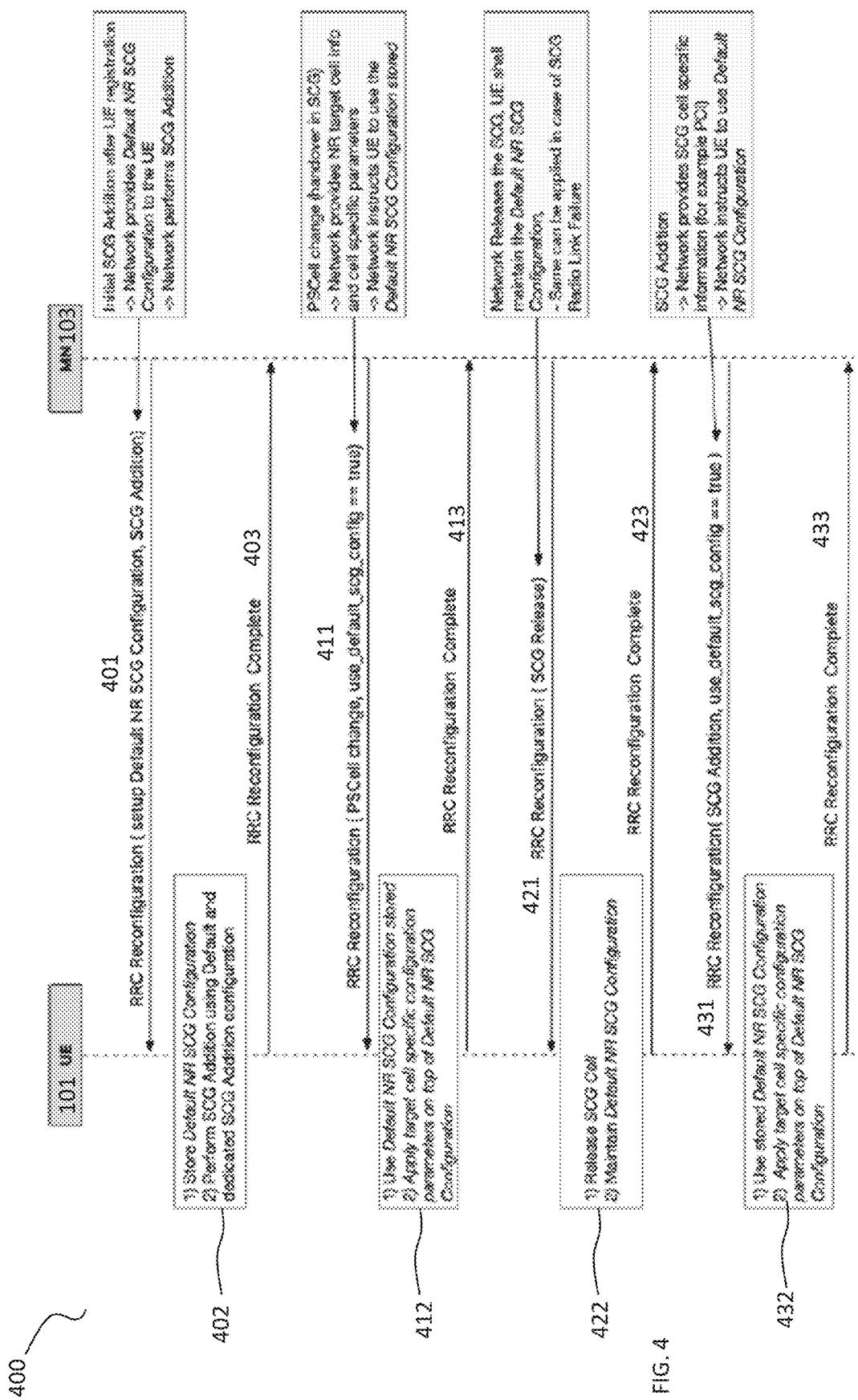
FIGS. 4-8 illustrate example sequence diagrams illustrating operations performed by a UE to communicate in a first RAT and a second RAT, according to some aspects of the disclosure.

FIG. 4 illustrate an example sequence diagram 400 with details for operations performed at 302, where a default configuration information is provided. In addition, how the default configuration information is used in various situations is also presented. The use of default configuration information across multiple NR cells can avoid control signaling over LTE carrying redundant information for NR SCG configuration. The default configuration information can be referred to as Default NR SCG Configuration.

In some embodiments, base station 103 acts as a master node to configure the default configuration information to be sent to UE 101. The default configuration information can contain a part or all parameters that are common across multiple NR SCG cells. It can also contain the default configuration for NR secondary cells, for example additional NR downlink carrier.

At 401, the default configuration information can be carried in a RRC connection reconfiguration message over LTE to be transmitted to UE 101. At 402, UE 101 can store the default configuration information in UE 101. UE 101 can further perform SCG addition using the default configuration information in addition to some dedicated SCG addition configuration. At 403, UE 101 can send a message, e.g., RRC Reconfiguration complete message, to base station 103.

In some examples, the default configuration information can be used for SCG addition procedures as well as for PSCell change procedure (handover of primary NR cell in SCG). At 411, a RRC connection reconfiguration message over LTE is transmitted from base station 103 to UE 101, where the RRC connection reconfiguration message can indicate a PSCell change. At 412, UE 101 can use or apply the stored default configuration information, based on the instruction received from base station 103. At 413, UE 101 can send a message, e.g., RRC Reconfiguration complete message, to base station 103 to indicate the PSCell change has been completed.

In some examples, network can control when to release the default configuration information, for example in case a default configuration does not apply for certain cells or areas in the network. When UE 101 moves from one LTE cell to another LTE, the default NR configuration may have changed in large part, base station 103 can provide a new default NR configuration overwriting the old default NR configuration. Additionally and alternatively, base station 103 can instruct UE 101 explicitly to release the old default configuration or a part of the default configuration information. At 421, a RRC connection reconfiguration message over LTE is transmitted from base station 103 to UE 101, where the RRC connection reconfiguration message can indicate to release information about the SCG cell stored in UE 101. At 422, UE 101 can release information about the SCG cell stored in UE 101, while maintaining other default configuration information. At 423, UE 101 can send a message, e.g., RRC Reconfiguration complete message, to base station 103 to indicate the information about the SCG cell has been released. In some examples, network can at any time provide a new default NR SCG configuration using LTE RRC connection reconfiguration message. When UE 101 moves into a different area or on different cell that require a modified NR configuration, UE 101 may need a new default configuration information.

In some examples, UE 101 can use the stored default configuration information to perform SCG addition to access the NR service using the NR RAT. At 431, a RRC connection reconfiguration message over LTE is transmitted from base station 103 to UE 101, where the RRC connection reconfiguration message can instruct UE 101 to use the default configuration information to perform SCG addition. In addition, the RRC connection reconfiguration message can carry any SCG cell specific information, such as information on PCI. At 432, UE 101 can use or apply the stored default configuration information, based on the instruction received from base station 103, in addition to any target cell specific configuration parameters on top of the default configuration information. At 433, UE 101 can send a message, e.g., RRC Reconfiguration complete message, to base station 103 to indicate the SCG addition has been completed.

In some examples, network can instruct UE 101 via RRC reconfiguration message whether to use the default NR SCG configuration or not. In some examples, a flag can be introduced to NR part of the LTE RRC Reconfiguration message, as shown below, which is an enhancement to the existing LTE ASN1 message definition to carry the Default NR SCG Configuration:

As shown above, the default configuration has the same structure definition and can carry the same content as the legacy NR Configuration already defined by 3 GPP. The default configuration contains configuration of Radio bearers, Physical Layer Configuration and Measurement Configurations. Using this approach of Default NR SCG Configuration, the network node has the full control when and for which cell(s) it makes use of the Default NR SCG Configuration and when to modify or release it. The UE consumes the configuration and applies it as per network commands. Operators/network vendors can define the set/content of NR SCG configuration parameters that are common across multiple NR SCG cells to be part of the Default NR SCG Configuration. The procedure can be applied for small or large areas depending on network deployments.

Figure 5:
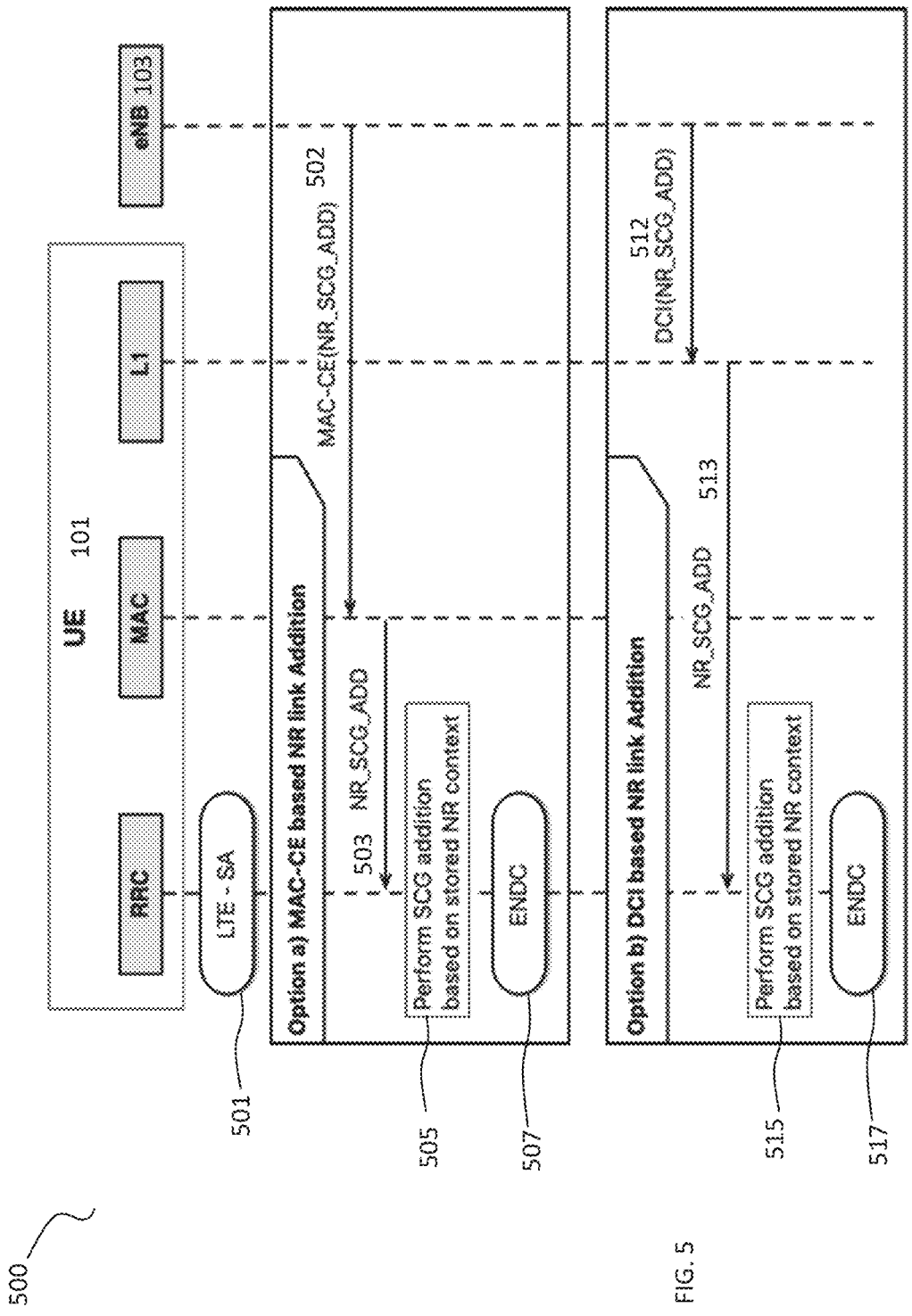

FIG. 5 illustrate an example sequence diagram 500 with details for operations performed at 304, where UE 101 can receive, from the first base station using the first RAT, a downlink message to enable a communication link between the UE and the second base station via the second RAT. Instead of triggering the NR link addition and the NR link release using comparably slow RRC signaling, the activation of a preserved NR configuration can be done much quicker using LTE MAC Control Element signaling or DCI signaling. This also applies for NR measurement and measurement report configurations. Provided measurement configurations can be enabled or disabled using MAC-CE or even DCI signaling preventing repeated slow RRC signaling.

At 501, UE 101 can operate in the LTE standalone (SA) mode. At 502, UE 101 can receive a MAC-CE message indicating to add a NR SCG link. The MAC-CE message is received by the MAC layer of UE 101. At 503, the MAC layer of UE 101 can instruct the RRC layer of UE 101 to add the NR SCG link. At 505, the RRC layer of UE 101 can perform SCG addition based on the stored NR context, e.g., the default configuration information. At 507, UE 101 enters EN-DC mode where dual connectivity are maintained.

Additionally and alternatively, a DCI message can be used in place of the MAC-CE message. At 512, UE 101 can receive a DCI message indicating to add a NR SCG link. The DCI message is received by the L1 layer of UE 101. At 513, the L1 layer of UE 101 can instruct the RRC layer of UE 101 to add the NR SCG link. At 515, the RRC layer of UE 101 can perform SCG addition based on the stored NR context,

```
nr-Config-r15   CHOICE      {
    release                 NULL,
    setup                   SEQUENCE {
        endc-ReleaseAndAdd-r15BOOLEAN,
        nr-SecondaryCellGroupConfig-15      OCTET STRING    OPTIONAL,   --NEED ON
        p-MaxEUTRA-r15      P-Max                           OPTIONAL    -- NEED ON
    }
}                                                           OPTIONAL,   -- NEED ON
    sk-Counter-r15          INTEGER     (0.. 65535)         OPTIONAL,   -- NEED ON
    nr-RadioBearerConfig1-r15           OCTET STRING        OPTIONAL,   -- Need ON
    nr-RadioBearerConfig2-r15           OCTET STRING        OPTIONAL,   -- Need ON
    tdm-PatternConfig-r15               TDM-PatternConfig-r15           OPTIONAL,   -- Cond FDD-PCell
Default-NR-SCG-Configuration            CHOICE    {
    release                 NULL,
    setup                   SEQUENCE    {                   OCTET STRING            OPTIONAL,
        nr-SecondaryCellGroupConfig-r15                     OCTET STRING            OPTIONAL,
        nr-RadioBearerConfig1-r15                           OCTET STRING            OPTIONAL,
        nr-RadioBearerConfig2-r15
    }
                                                                        OPTIONAL
}
use_default_scg_config      BOOLEAN,
``` e.g., the default configuration information. At 517, UE 101 enters EN-DC mode where dual connectivity are maintained.

Figure 6:
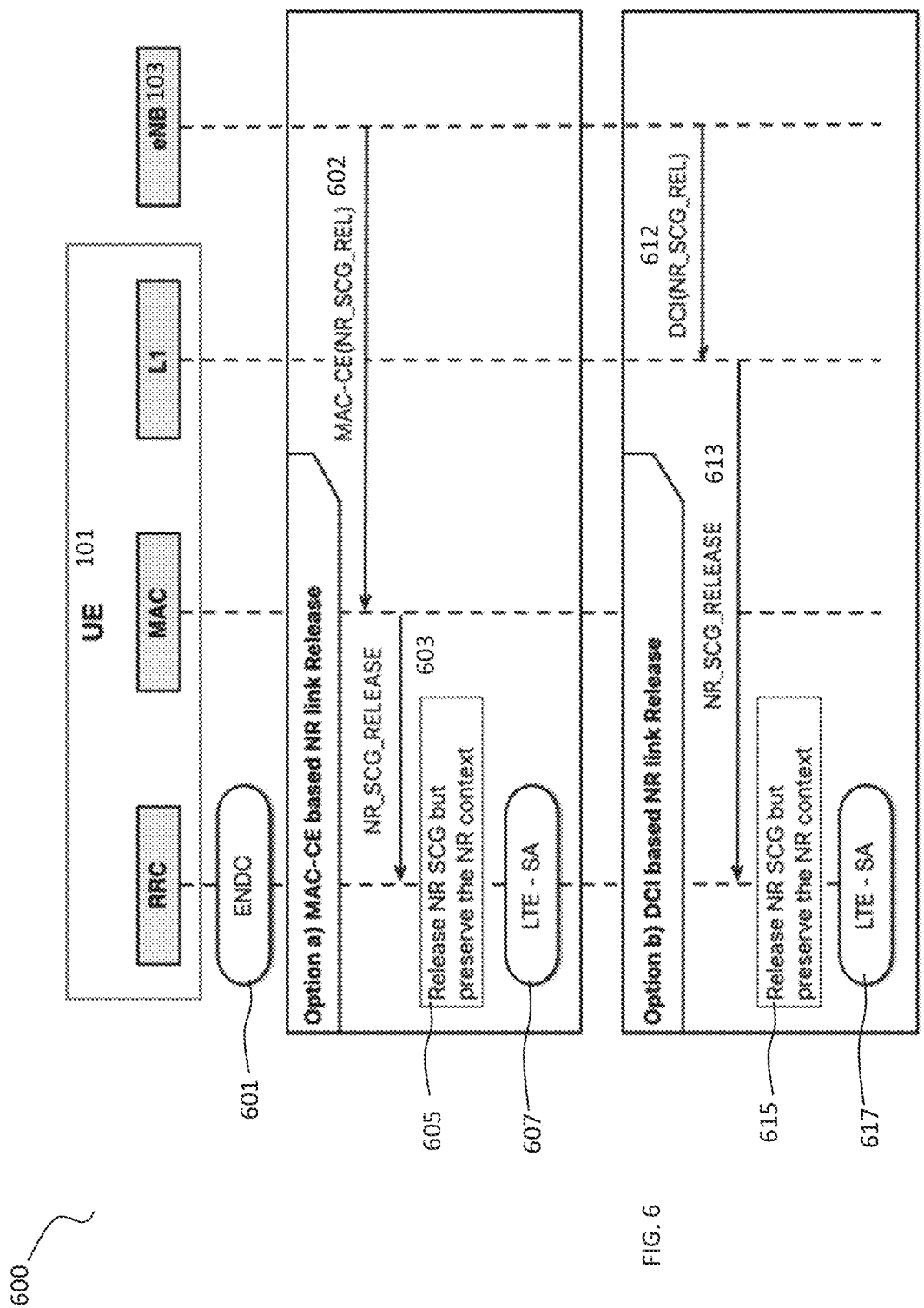

FIG. 6 illustrate an example sequence diagram 600 with details for operations to deactivate a communication link between the UE and the second base station via the second RAT. Instead of deactivating the NR link using comparably slow RRC signaling, the deactivating of the NR link can be done much quicker using LTE MAC Control Element signaling or DCI signaling.

At 601, UE 101 can operate in the EN-DC mode. At 602, UE 101 can receive a MAC-CE message indicating to deactivate or release a NR SCG link. The MAC-CE message is received by the MAC layer of UE 101. At 603, the MAC layer of UE 101 can instruct the RRC layer of UE 101 to release the NR SCG link. At 605, the RRC layer of UE 101 can release the SCG link, but preserve the NR context, which is the link configuration for the released communication link. At 607, UE 101 enters LTE SA mode without dual connectivity.

Additionally and alternatively, a DCI message can be used in place of the MAC-CE message. At 612, UE 101 can receive a DCI message indicating to deactivate or release a NR SCG link. The DCI message is received by the L1 layer of UE 101. At 613, the L1 layer of UE 101 can instruct the RRC layer of UE 101 to release the NR SCG link. At 615, the RRC layer of UE 101 can release the SCG link, but preserve the NR context, which is the link configuration for the released communication link. At 617, UE 101 enters LTE SA mode without dual connectivity.

Figure 7:
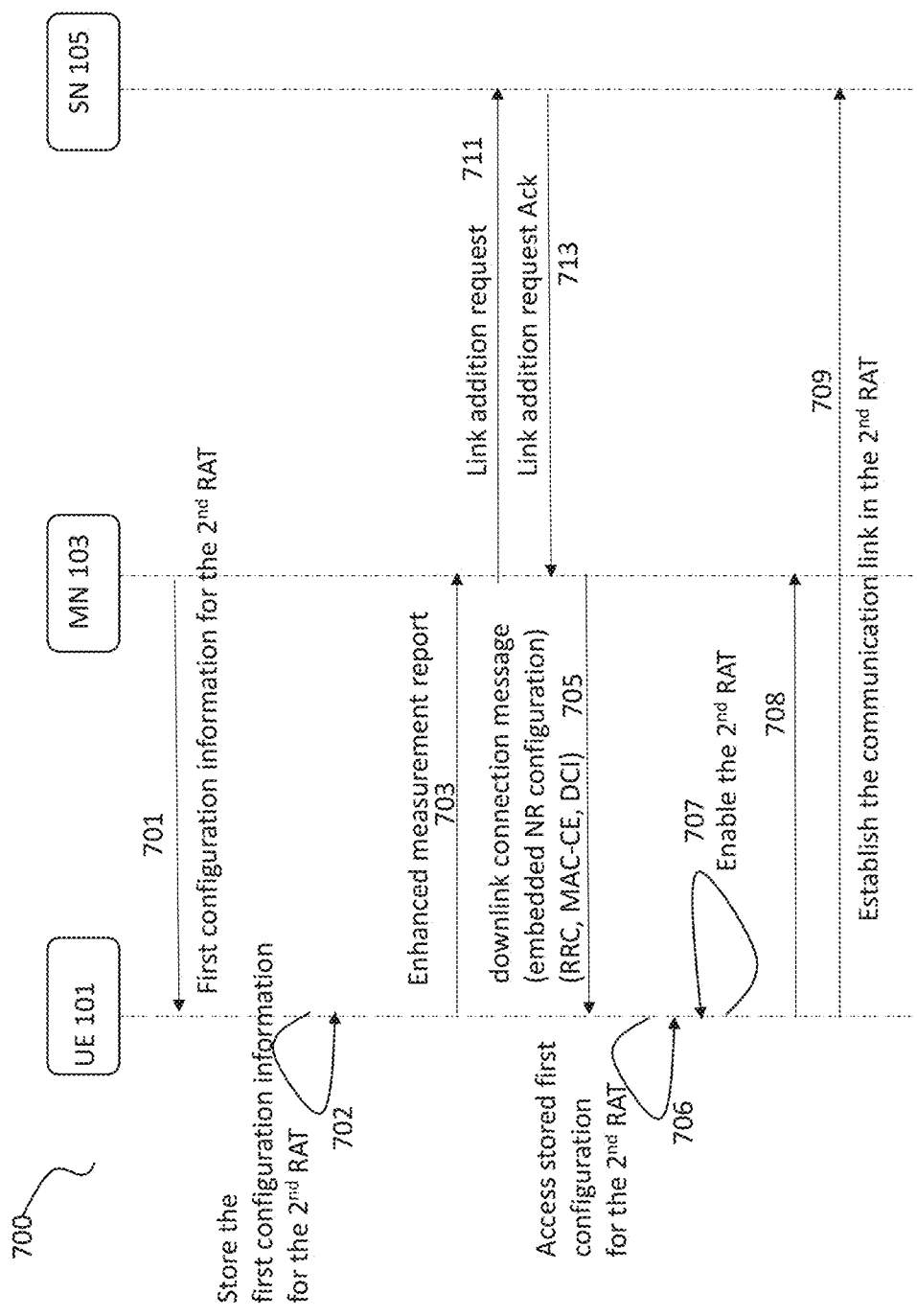

FIG. 7 illustrates an example sequence diagram 700 illustrating operations performed by a UE 101, base station 103 which is a master node (MN), and base station 105 which is a secondary node (SN), according to some aspects of the disclosure. Sequence diagram 700 is an example of method 300 shown in FIG. 3.

At 701, UE 101 can receive from base station 103 a message containing a first configuration information for the second RAT. The first configuration information can be default configuration information received in a RRC message in the first RAT from base station 103. The default configuration information can include shared parameters for the UE to communicate across multiple base stations including the second base station in the second RAT. Operations performed at 701 can be examples of operations performed at 302.

At 702, UE 101 can store the first configuration information for the second RAT in a memory of the UE, e.g., memory 112.

At 703, UE 101 can perform a measurement to detect whether a service in the second RAT is available to the UE. When the service in the second RAT is available, UE 101 can generate, based on the performed measurement, a measurement report including an indication that the first configuration information is stored in the UE, and send the measurement report to base station 103.

At 711, base station 103 can send a request for link addition to base station 105. At 713, base station 105 can send an acknowledgement to base station 103 to acknowledge the receipt of the link addition request.

At 705, UE 101 can receive from base station 103 using the first RAT, a downlink message to enable a communication link between the UE and the second base station via the second RAT. The downlink message includes second configuration information for the UE to communicate with the second base station via the second RAT. Operations performed at 705 can be examples of operations performed at 304. For example, operations shown in sequence diagram 500 can be example operations performed at 705.

At 706, UE 101 can access the stored first configuration information, which can be combined with the second configuration information to generate a link configuration for the UE to communicate with the second base station via the second RAT.

At 707, UE 101 can enable the communication with the second base station via the second RAT.

At 708, UE 101 can send a message to base station 103 to acknowledge communication with the second base station via the second RAT is enabled.

At 709, UE 101 can establish the communication link between the UE and the second base station using the second RAT based on a link configuration obtained from the first configuration information and the second configuration information.

Figure 8:
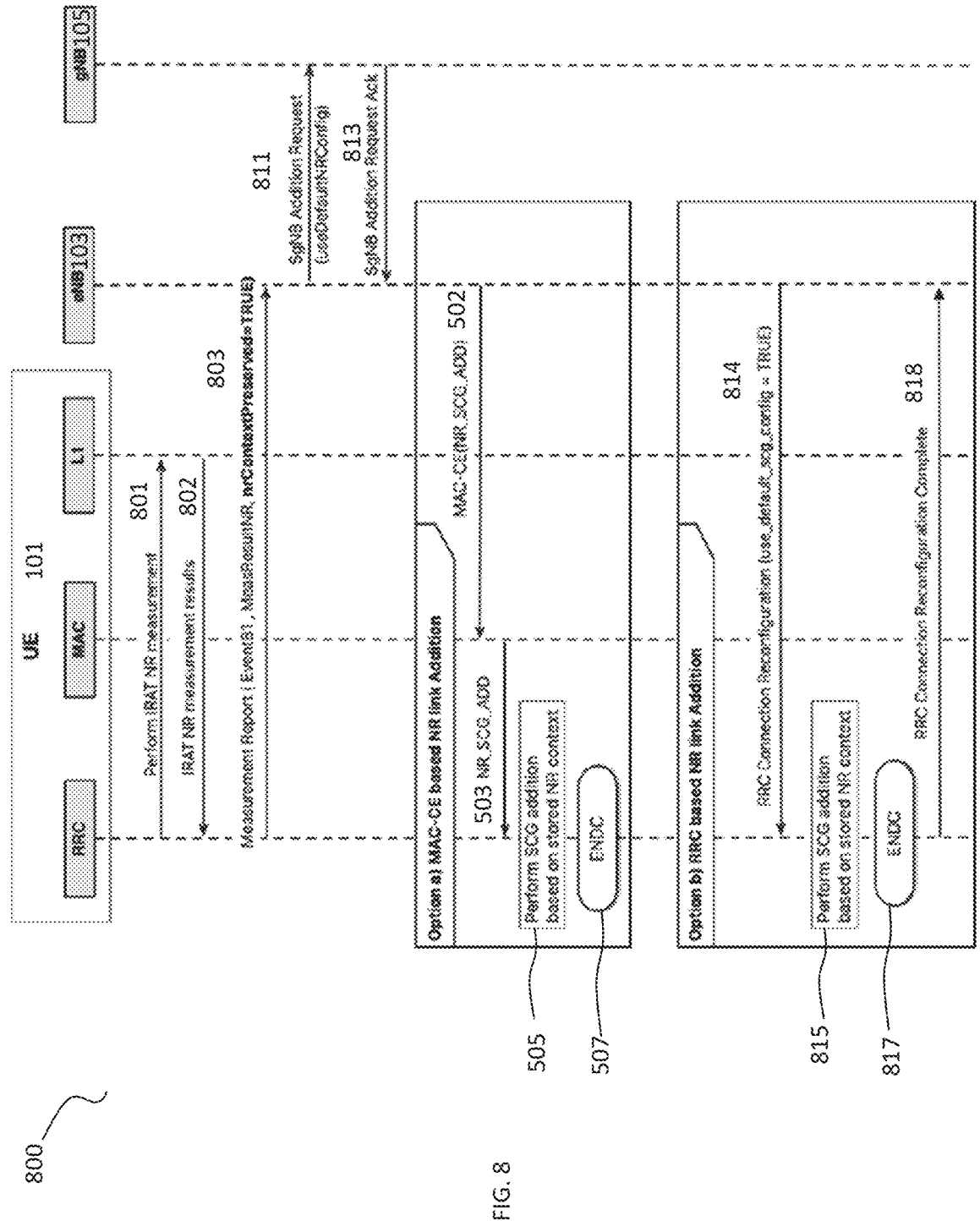

FIG. 8 illustrates an example sequence diagram 800 illustrating operations performed by a UE 101, base station 103, and base station 105. Sequence diagram 800 is an example of method 300 shown in FIG. 3, and is an example of the sequence diagram 700 shown in FIG. 7. In details, FIG. 8 shows the message flow for adding the NR link using a NR context stored by the UE after UE has indicated the availability of the NR context. The NR context can be a default configuration information or a configuration information saved from a previous communication link.

At 801, the RRC layer of UE 101 can inform the L1 layer of UE 101 to perform NR measurement for inter radio access technology (IRAT) to detect UE 101 (re)enters the NR coverage. At 802, the L1 layer of UE 101 can inform the RRC layer of UE 101 the IRAT NR measurement results.

At 803, UE 101 can generate, based on the performed measurement, a measurement report including an indication that a configuration information is stored in the UE, e.g., by setting the parameter nrContextPreserved=true, and send the measurement report to base station 103. Measurement report 117 and indication 119 can be such an example. This LTE Measurement report message can be enhanced to carry the information about a NR configuration preserved by the UE. This can either include the information that the UE has retained the previous NR Context or that UE has a NR default configuration stored.

In some example, the LTE measurement report message can be enhanced by an appropriate information element (IE) that can carry the related information.

```
MeasurementReport:
    criticalExtensions c1: measurementReport-r8:
        measResults:: = SEQUENCE {
            measId           MeasId,
            measResultPCell  SEQUENCE {
                rsrpResult       RSRP-Range,
                rsrqResult       RSRQ-Range
            },
            measRes|ultNeighCells measResultNeighCellListNR-r15:
            {
                pci-r15 PhysCellIdNR-r15,
                measResultCell-r15
                    rsrpResult-r15 RSRP-RangeNR-r15
                    rsrqResult-r15  RSRQ-RangeNR-r15
            },
            nrContextPreserved (TRUE)         OPTIONAL
```

The nrContextPreserved is an improvement over the current solution for LTE measurement reporting (typically event B1). When B1 measurement reporting is used to inform the network that UE has entered NR coverage, no such a parameter is available. Based on the reported NR cells and measurement results the network selects the most suitable NR cell for setting up the NR link. When nrContextPreserved is set to true to indicate a NR context is saved, master network node and secondary NR network node can make use of this information to directly activate the NR link using the configuration stored by the UE or at least limiting any reconfiguration of the UE to the bare minimum instead of providing a full blown NR Configuration.

The measurement report received at 803 can trigger base station 103 to set up a NR communication link. At 811, base station 103 can send a request for link addition to base station 105. At 813, base station 105 can send an acknowledgement to base station 103 to acknowledge the receipt of the link addition request.

Afterwards, a downlink message can be sent by base station 103 to enable a communication link between the UE and the second base station via the second RAT. For operations shown at 502, 503, 505, and 507, the activation of a preserved NR configuration can be done much quicker using LTE MAC Control Element signaling, as shown in FIG. 5.

Additionally and alternatively, a RRC message can be used in place of the MAC-CE message. At 814, the RRC layer of UE 101 can receive a RRC message indicating to add a NR SCG link. At 815, the RRC layer of UE 101 can perform SCG addition based on the stored NR context, e.g., the default configuration information. At 817, UE 101 enters EN-DC mode where dual connectivity are maintained. At 818, UE 101 can send a message to base station 103 to indicate the RRC connection reconfiguration has been completed.

Figure 9:
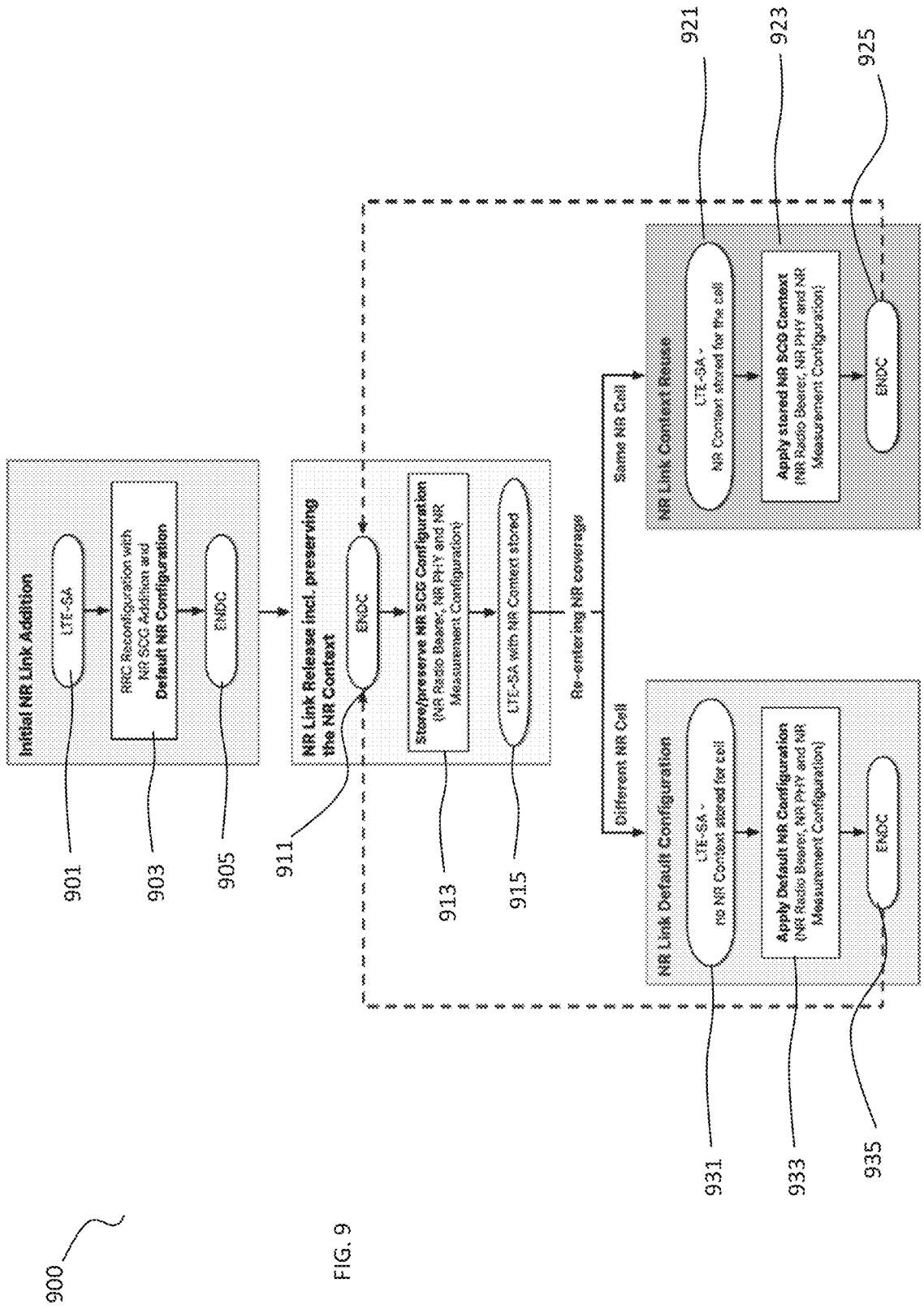
FIGS. 9-10 illustrate example block diagrams illustrating operations performed by a UE to communicate in a first RAT and a second RAT, according to some aspects of the disclosure.

FIG. 9 illustrates an example block diagram 900 illustrating operations performed by a UE to communicate in a first RAT and a second RAT, according to some aspects of the disclosure. Operations shown in block diagram 900 are example operations shown in FIGS. 3-8.

At 901, UE 101 is in the LTE SA mode. At 903, UE 101 can perform initial NR SCG addition operations, base station 103 can provide the default NR configuration information, where the default NR configuration information can contain all parameters that are common across multiple NR cells in a certain area. The default NR configuration information can be used as baseline when moving to a new NR cell, either when setting up a NR link entering a new cell or in case of NR handover from one cell to another cell. At 905, the NR SCG addition operations have been completed, and UE 101 enters the EN-DC mode with dual connectivity.

At 911, UE 101 is in the EN-DC mode with dual connectivity. UE 101 can receive instructions to release the NR communication link. At 913, UE 101 can store the NR SCG configuration information. At 915, UE 101 can enter LTE SA mode with NR context stored. UE 101 can release the NR communication link upon leaving NR coverage area. When leaving coverage of the NR cell, upon NR link release, UE and network autonomously preserves the NR context. The release of NR link can be signaled using MAC-CE on LTE, no RRC signaling.

At 921, when UE 101 re-enters coverage of the same NR cell, UE 101 can report in measurement report message that it has a preserved NR context for this cell. At 923, network considers the preserved NR context and re-activates the NR link using MAC-CE signaling. UE 101 and network can use the same NR configuration as during previous NR link connection. At 925, UE 101 can enter EN-DC mode to have dual connectivity.

At 931, UE 101 re-enters NR coverage under a different NR cell. When entering NR coverage under a different NR cell, UE 101 reports that it does not have a NR context stored for this cell. Network considers the report and uses RRC signaling for adding the NR link on the new target cell. Network considers that UE has a default NR configuration stored and network only signals the cell specific parts of the configuration, like for example the PCI of the target cell. Network instructs the UE to uses the default NR configuration stored and instructs to apply the updated cell specific configuration parameters on top of the default configuration. At 933, UE 101 can apply the default NR configuration stored together with the updated cell specific configuration parameters to establish a new NR link. At 935, UE 101 enters EN-DC mode to have dual connectivity.

Figure 10:
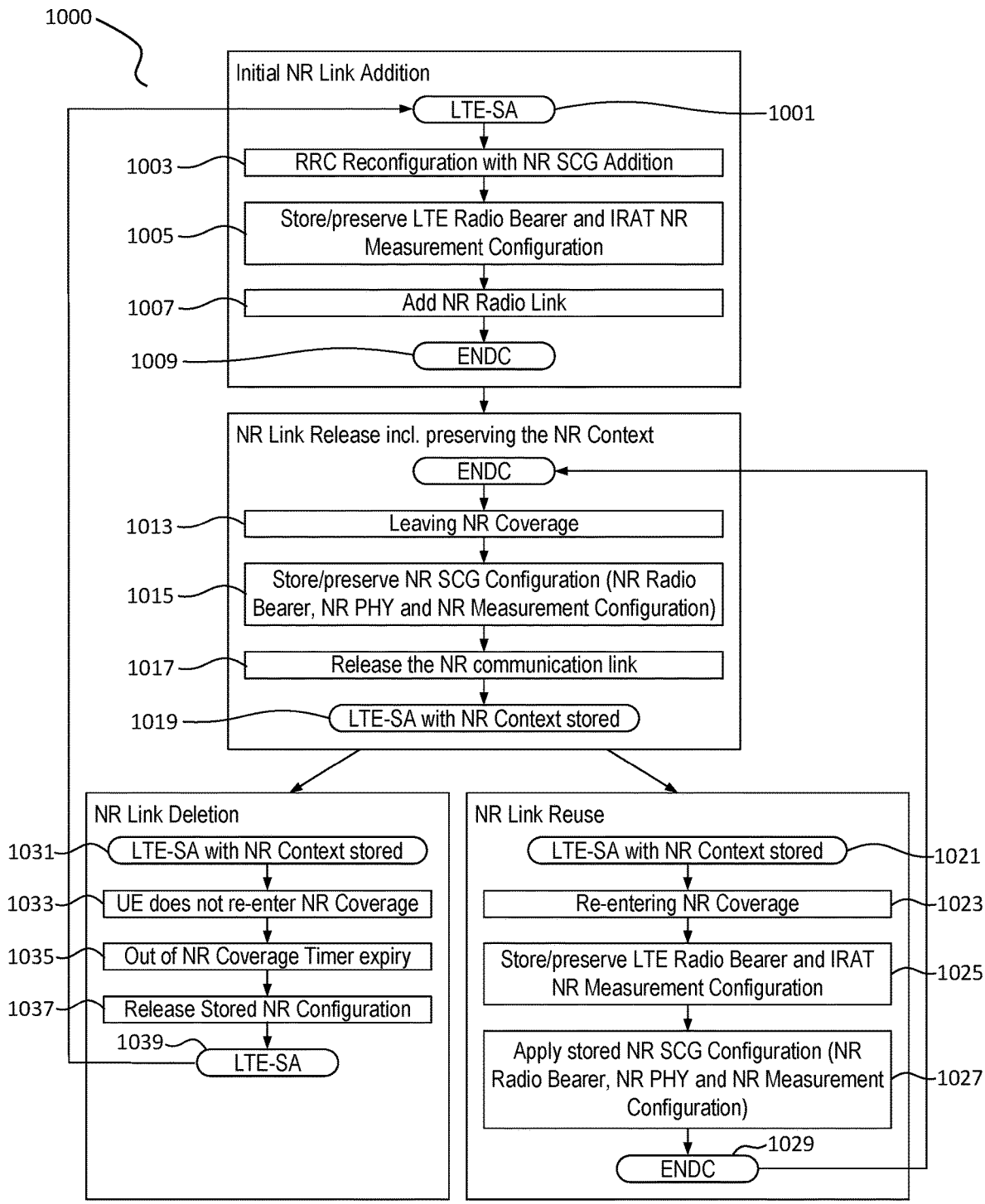

FIG. 10 illustrates an example block diagram 1000 illustrating operations performed by a UE to communicate in a first RAT and a second RAT, according to some aspects of the disclosure. Operations shown in block diagram 900 are example operations shown in FIGS. 3-9.

In examples, the RRC reconfiguration messages to add an NR link are almost the same for one UE. To reduce the size or even prevent repeated control messages with same content, embodiments herein retain the NR context at NR link release so it can be used for adding the NR link again at later point in time. When the NR link is added at a later time, the network only signals the portion of RRC messages that is different every time, which may be called delta parameters.

UE and network can maintain two configurations in parallel, a LTE configuration for pure LTE SA operation, and a configuration for EN-DC mode operations. Upon addition of NR link or upon release of NR link, UE switches between the two configurations. The LTE configuration can stay the same as long as the UE stays in the same cell since LTE link is never broken. The LTE configuration can include, but not limited to Connected Mode Discontinuous Reception (CDRX) configuration, Channel Quality Indicator (CQI)/Precoding Matrix Indicator (PMI) configuration, Scheduling request (SR) configuration, Physical Uplink Control Channel (PUCCH) configuration, and other related configurations.

Delta parameters could be included in enhanced RRC Reconfiguration message to setup NR link and adjust the NR configuration. For example, delta parameters can be used in accessing a different NR cell to signal the updated Physical Cell ID of the NR cell or signal updated cell specific parameters. The network can keep monitoring whether there is major change to NR configuration, for example in case of NR PCI change. If so, network can also send a full RRC Reconfiguration message as a fallback method. Alternatively, if network does not want to keep tracking this info, then UE can monitor that and indicate back to NW during event B1 NR report.

NR related configurations can be alternatively designed as RRC signaled configurations maintained by the UE, while the activation and deactivation control is implemented via MAC Control Element signaling or Downlink Control Indication (DCI) signaling. Multiple NR measurement configurations can be signaled once in earlier RRC messages (when UE first camped/handover to the current cell), but activate/deactivate using MAC-CE/DCI or higher layer signaling. UE only measure/report based on activated measurement/report configurations.

Data Radio Bearer setups/configuration on different RATs can be designed similarly with two configurations signaled to UE using a single RRC Reconfiguration message. At any time, only one RAT, either LTE or NR, has data bearers active, while the other RAT has data bearers in configured but not activated state or mode. When NR link is active the user data will make use of NR Data Radio Bearer (alternatively also a split radio bearer can be used in this case transferring the user data using NR and LTE data path). When the NR link is deactivated all user data will flow over the LTE Data Radio Bearer configured. MAC Control Element Signaling can be used to enable one and disable the other configuration when NR branch is added or removed. Multiple radio bearer can be configured at the same time. Embodiments herein can employ enhanced RRC signaling to carry the information which Radio Bearer Configuration is activated and which Radio Bearer Configuration is deactivated. MAC-CE signaling is enhanced to carry the information which Radio Bearer can be deactivated and which Radio Bearer can be activated.

When UE moves out of NR coverage and does not return after some time, it is not useful to maintain the NR configuration context forever. Hence, the link configuration for a previous communication link can be maintained for a certain time, such as within 10 or 20 seconds. A timer can be used to monitor the validity of the NR Context. The network can keep a timer for NR link deactivation to maintain the RRC Reconfiguration parameters. The UE can maintain the NR Context only for a certain duration until it deletes the old context. The duration can be network configured. Upon timer expiration, the UE and network can delete the preserved NR Configuration context. Accordingly, any subsequent NR link addition would then require a full configuration.

At 1001, UE 101 is in the LTE SA mode. At 1003, UE 101 can perform initial NR link addition operations, base station 103 can provide the default NR configuration information, where the default NR configuration information can contain all parameters that are common across multiple NR cells in a certain area. At 1005, UE 101 can store the LTE radio bearer and IRAT NR measurement configuration. At 1007, UE 101 can perform SCG addition operations. At 1009, UE 101 enters the EN-DC mode with dual connectivity.

At 1011, UE 101 is in the EN-DC mode with dual connectivity. At 1013, UE 101 can receive instructions to release the NR communication link. At 1015, UE 101 can store the NR SCG configuration information. At 1017, UE 101 can release the NR communication link upon leaving NR coverage area. At 1019, UE 101 can enter LTE SA mode with NR context stored.

At 1021, UE 101 is in LTE SA mode with NR context stored. At 1023, UE 101 re-enters coverage of the same NR cell. At 1025, UE 101 can report in measurement report message that it has a preserved NR context for this cell. At 1027, network considers the preserved NR context and re-activates the NR link using MAC-CE signaling. UE 101 and network can use the same NR configuration as during previous NR link connection. At 1029, UE 101 can enter EN-DC mode to have dual connectivity.

At 1031, UE 101 is in LTE SA mode with NR context stored. At 1033, UE 101 does not re-enter NR coverage. At 1035, a timer used to account for the time out of NR coverage expires. At 1037, UE 101 can release stored NR configuration. At 1039, UE 101 remain in the LTE SA mode.

Figure 11:
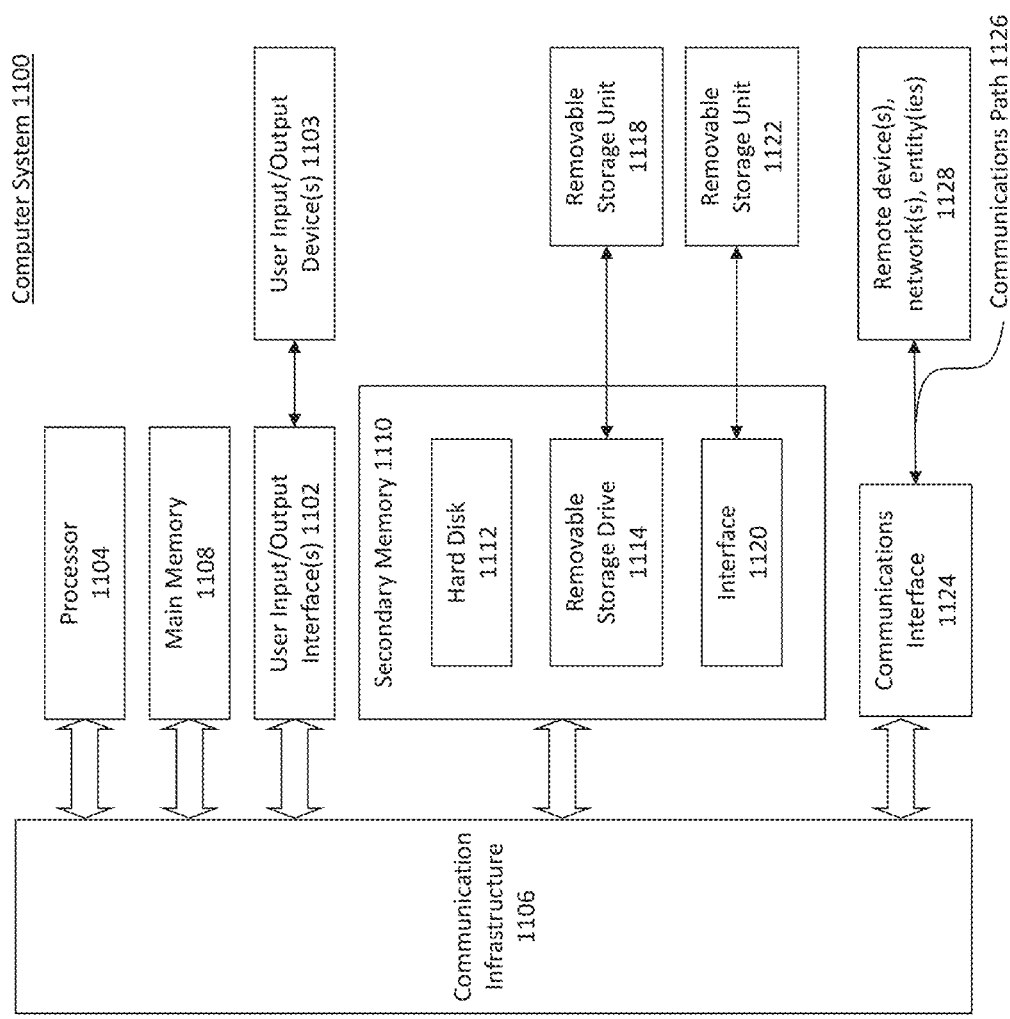
FIG. 11 is an example computer system for implementing some aspects or portion(s) thereof of the disclosure provided herein.

Various aspects can be implemented, for example, using one or more computer systems, such as computer system 1100 shown in FIG. 11. Computer system 1100 can be any computer capable of performing the functions described herein such as UE 101, base station 103, base station 105, or base station 107 as shown in FIG. 1 and FIG. 2. Computer system 1100 includes one or more processors (also called central processing units, or CPUs), such as a processor 1104. Processor 1104 is connected to a communication infrastructure 1106 (e.g., a bus). Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some aspects, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 1108, the removable storage unit 1118, the removable storage unit 1122 can store instructions that, when executed by processor 1104, cause processor 1104 to perform operations for a UE or a base station, e.g., UE 101, base station 103, base station 105, base station 107, as shown in FIG. 1 and FIG. 2. In some examples, the operations include those operations illustrated and described in FIGS. 3-10.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126. Operations of the communication interface 1124 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 11. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

The invention claimed is:

1. A user equipment (UE), comprising:
a transceiver configured to enable wireless communication with a first base station using a first radio access technology (RAT) and with a second base station using a second RAT;
a memory that stores first configuration information for the UE to communicate with the second base station using the second RAT, wherein the first configuration information includes default configuration information received from the first base station using the first RAT and is further used to communicate with the second base station; and
a processor, communicatively coupled to the transceiver and the memory, configured to:
receive, from the first base station using the first RAT, a downlink message to enable a communication link between the UE and the second base station via the second RAT, wherein the downlink message is generated in response to a measurement report sent to the first base station based on a measurement performed by the UE to detect a service in the second RAT is available to the UE, the measurement report including an indication that the first configuration information is stored in the UE, and the downlink message includes second configuration information for the UE to communicate with the second base station via the second RAT; and
establish the communication link between the UE and the second base station using the second RAT based on a link configuration determined from the first configuration information and the second configuration information,
wherein the second configuration information is received as a relative difference over the default configuration information, the second configuration information is of a smaller size than the default configuration information, and the second configuration information is to enable establishment of the communication link between the UE and second base station using the second RAT, and wherein the second RAT is a new radio (NR) RAT and the first RAT is different from the NR RAT.

2. The UE of claim 1, wherein the second configuration information includes information to update one or more parameters of the first configuration information.

3. The UE of claim 1, wherein the downlink message includes a radio resource control (RRC) message for the first RAT, a medium access control (MAC)-control element (MAC-CE) for the first RAT, or a downlink control information (DCI) for the first RAT.

4. The UE of claim 1, wherein the first configuration information includes data radio bearer configuration information, physical layer (PHY) configuration information, measurement configuration information, a physical cell identifier (PCI), or a UE identifier.

5. The UE of claim 1, wherein the first configuration information includes the default configuration information received in a radio resource control (RRC) message from the first base station using the first RAT, and wherein the default configuration information includes shared parameters for the UE to communicate across multiple base stations of the NR RAT including the second base station using the second RAT that is the NR RAT.

6. The UE of claim 1, wherein the first configuration information includes a link configuration for a previous communication link between the UE and the second base station using the second RAT that is stored in the memory based on the previous communication link being released before receiving the downlink message to enable the communication link between the UE and the second base station via the second RAT.

7. The UE of claim 6, wherein the processor is further configured to:
receive a downlink release message using the first RAT from the first base station to release the previous communication link using the second RAT;
store, in the memory, the link configuration for the previous communication link between the UE and the second base station using the second RAT; and
release the previous communication link between the UE and the second base station.

8. The UE of claim 1, wherein the processor is further configured to:
perform the measurement to detect whether the service in the second RAT is available to the UE;
generate, based on the performed measurement, the measurement report including the indication that the first configuration information is stored in the UE; and
send the measurement report to the first base station, wherein the establishing the communication link between the UE and the second base station in the second RAT is based on the measurement report.

9. The UE of claim 1, further comprising a timer, wherein the first configuration information stored in the memory becomes invalid based on expiration of the timer.

10. The UE of claim 1, wherein the downlink message to enable the communication link between the UE and the second base station is received based on:
the UE entering a cell managed by the second base station,
the UE being handed over from an other cell to the cell managed by the second base station, or
the UE re-entering the cell managed by the second base station after leaving the cell.

11. The UE of claim 1, wherein the first RAT includes universal mobile telecommunications system (UMTS) terrestrial radio access network (UTRAN), global system for mobiles (GSM) edge radio access network (GERAN), or long-term evolution (LTE) evolved utran (E-UTRAN), the second RAT includes new radio (NR) next generation radio access network (NG-RAN); and
the first base station includes an evolved NodeB (eNB), and the second base station includes a next generation NodeB (gNB).

12. A method of operating a user equipment (UE), comprising:
receiving, from a first base station using a first radio access technology (RAT), first configuration information for the UE to communicate with a second base station via a second RAT, wherein the first configuration information includes default configuration information received from the first base station using the first RAT and is further used to communicate with the second base station;
receiving, from the first base station using the first RAT, a downlink message to enable a communication link between the UE and the second base station via the second RAT, wherein the downlink message is generated in response to a measurement report sent to the first base station based on a measurement performed by the UE to detect a service in the second RAT is available to the UE, the measurement report including an indication that the first configuration information is stored in the UE, and the downlink message includes second configuration information for the UE to communicate with the second base station via the second RAT; and
establishing the communication link between the UE and the second base station using the second RAT based on a link configuration determined from the first configuration information and the second configuration information,
wherein the second configuration information is received as a relative difference over the default configuration information, the second configuration information is of a smaller size than the default configuration information, and the second configuration information is to enable establishment of the communication link between the UE and second base station using the second RAT, and wherein the second RAT is a new radio (NR) RAT and the first RAT is different from the NR RAT.

13. The method of claim 12, wherein the downlink message includes a radio resource control (RRC) message for the first RAT, a medium access control (MAC)-control element (MAC-CE) for the first RAT, or a downlink control information (DCI) for the first RAT.

14. The method of claim 12, wherein the first configuration information includes data radio bearer configuration information, physical layer (PHY) configuration information, measurement configuration information, a physical cell identifier (PCI), or a UE identifier.

15. The method of claim 12, wherein the first configuration information includes the default configuration information received in a radio resource control (RRC) message from the first base station using the first RAT, and wherein the default configuration information includes shared parameters for the UE to communicate across multiple base stations of the NR RAT including the second base station using the second RAT that is the NR RAT.

16. The method of claim 12, wherein the first configuration information includes a link configuration for a previous communication link between the UE and the second base station using the second RAT that is stored in a memory of the UE based on the previous communication link being released before receiving the downlink message to enable the communication link between the UE and the second base station via the second RAT.

17. The method of claim 16, further comprising:
receiving a downlink release message using the first RAT from the first base station to release the previous communication link using the second RAT;
storing, in the memory, the link configuration for the previous communication link between the UE and the second base station using the second RAT; and
releasing the previous communication link between the UE and the second base station.

18. The method of claim 12, further comprising:
performing the measurement to detect whether the service in the second RAT is available to the UE;
generating, based on the performed measurement, the measurement report including the indication that the first configuration information is stored in the UE; and
sending the measurement report to the first base station, wherein the establishing the communication link between the UE and the second base station in the second RAT is based on the measurement report.

19. A non-transitory computer-readable medium storing instructions that, when executed by a processor of a user equipment (UE), cause the UE to perform operations, the operations comprising:
receiving, from a first base station using a first radio access technology (RAT), first configuration information for the UE to communicate with a second base station via a second RAT, wherein the first configuration information includes default configuration information received from the first base station using the first RAT and is further used to communicate with the second base station;
receiving, from the first base station using the first RAT, a downlink message to enable a communication link between the UE and the second base station via the second RAT, wherein the downlink message is generated in response to a measurement report sent to the first base station based on a measurement performed by the UE to detect a service in the second RAT is available to the UE, the measurement report including an indication that the first configuration information is stored in the UE, and the downlink message includes second configuration information for the UE to communicate with the second base station via the second RAT; and
establishing the communication link between the UE and the second base station using the second RAT based on a link configuration determined from the first configuration information and the second configuration information,
wherein the second configuration information is received as a relative difference over the default configuration information, the second configuration information is of a smaller size than the default configuration information, and the second configuration information is to enable establishment of the communication link between the UE and second base station using the second RAT, and wherein the second RAT is a new radio (NR) RAT and the first RAT is different from the NR RAT.

20. The non-transitory computer-readable medium of claim 19, the operations further comprising:
performing the measurement to detect whether the service in the second RAT is available to the UE;
generating, based on the performed measurement, the measurement report including the indication that the first configuration information is stored in the UE; and
sending the measurement report to the first base station, wherein the establishing the communication link between the UE and the second base station in the second RAT is based on the measurement report.

* * * * *